US010222206B2

(12) United States Patent
Kimoto et al.

(10) Patent No.: US 10,222,206 B2
(45) Date of Patent: Mar. 5, 2019

(54) STOWAGE PATTERN CALCULATION DEVICE WHICH SETS POSITIONS AT WHICH ARTICLES ARE STACKED

(71) Applicant: FANUC CORPORATION, Yamanashi (JP)

(72) Inventors: Yuuki Kimoto, Yamanashi (JP); Yoshiharu Nagatsuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 157 days.

(21) Appl. No.: 15/296,142

(22) Filed: Oct. 18, 2016

(65) Prior Publication Data
US 2017/0146341 A1 May 25, 2017

(30) Foreign Application Priority Data
Nov. 20, 2015 (JP) ................. 2015-227792

(51) Int. Cl.
G06F 11/30 (2006.01)
G01B 21/00 (2006.01)
B65G 57/03 (2006.01)
B65G 61/00 (2006.01)

(52) U.S. Cl.
CPC ............ G01B 21/00 (2013.01); B65G 57/03 (2013.01); B65G 61/00 (2013.01); B65G 2203/0208 (2013.01); B65G 2203/041 (2013.01)

(58) Field of Classification Search
CPC ..................................................... G01B 21/00
See application file for complete search history.

(56) References Cited

U.S. PATENT DOCUMENTS

| 5,908,283 | A | 6/1999 | Huang et al. | |
|---|---|---|---|---|
| 8,583,277 | B2 * | 11/2013 | Kuehnennann | B65G 61/00 700/217 |
| 2008/0046116 | A1 | 2/2008 | Khan et al. | |
| 2010/0221094 | A1 | 9/2010 | Kuehnemann et al. | |
| 2010/0249989 | A1 | 9/2010 | Baldes et al. | |
| 2010/0268675 | A1 | 10/2010 | Baldes et al. | |
| 2013/0282165 | A1 | 10/2013 | Pankratov et al. | |

FOREIGN PATENT DOCUMENTS

| CN | 103586876 A | 2/2014 |
|---|---|---|
| DE | 202005020657 U1 | 6/2006 |
| DE | 102009011294 A1 | 9/2010 |

(Continued)

Primary Examiner — Phuong Huynh
(74) Attorney, Agent, or Firm — Hauptman Ham, LLP

(57) ABSTRACT

A stowage pattern calculation device calculates positions of articles irregularly conveyed. The plurality of articles have a box shape and include articles having dimensions different from each other. The stowage pattern calculation device includes a combination calculation part which calculates a combination of the articles constituting a layer formed in a storage area and selects a layer of the articles based on types of the articles, a height of the layer, and an area of the layer. The stowage pattern calculation device includes a position determination part which calculates a first probability of completion of the layer and determines positions at which the articles are stacked based on a positional relationship between a robot and the storage area and the first probability.

7 Claims, 18 Drawing Sheets

(56) References Cited

FOREIGN PATENT DOCUMENTS

| | | | |
|---|---|---|---|
| JP | 6-64750 | A | 3/1994 |
| JP | 7-291451 | A | 11/1995 |
| JP | 11-171342 | A | 6/1999 |
| JP | H11171342 | * | 6/1999 |
| JP | 2003-335417 | A | 11/2003 |
| JP | 2013-067448 | * | 4/2013 |
| JP | 2013-67448 | A | 4/2013 |
| JP | 2013071785 | A | 4/2013 |
| WO | 2013/059366 | A2 | 4/2013 |

* cited by examiner

LAYER HAVING ONE COLUMN | LAYER HAVING TWO COLUMNS | LAYER HAVING THREE COLUMNS (EXAMPLE OF INCONSTANT HEIGHT)   (EXAMPLE OF PLANAR SHAPE NOT RECTANGULAR)   (EXAMPLE OF PROTRUSION OUT OF STORAGE AREA)

FOURTH DISPOSITION PATTERN
(FOUR COMBINATIONS/
10 COMBINATIONS=40%)

SECOND DISPOSITION PATTERN
(18 COMBINATIONS/
120 COMBINATIONS=15%)

BOX CONVEYED BY CONVEYOR

STOWAGE PATTERN CALCULATION DEVICE WHICH SETS POSITIONS AT WHICH ARTICLES ARE STACKED

RELATED APPLICATIONS

The present application claims priority to Japanese Patent Application Number 2015-227792, filed Nov. 20, 2015, the disclosure of which is hereby incorporated by reference herein in its entirety.

BACKGROUND OF THE INVENTION

1. Field of the Invention

The present invention relates to a stowage pattern calculation device which sets positions at which articles are stacked.

2. Description of the Related Art

In article conveyance processes, a process of aligning and disposing a plurality of articles in a predetermined storage area exists. For example, a process of stacking articles conveyed one after another by a conveyor upon a pallet exists. Such a system for stacking articles conveyed by a conveyor upon a pallet is known as a palletizing system.

Japanese Unexamined Patent Publication No. 2013-71785 discloses a stowage device in which when a plurality of types of box bodies having different dimensions coexist, combinations of boxes are calculated based on a size of the box bodies. It is disclosed that in this device, the box bodies are disposed at four corners of a box storage means and then the boxes are disposed at region other than the four corners.

SUMMARY OF THE INVENTION

When box-shaped articles are stacked upon a pallet or the like, there is a case in which a plurality of types of articles is stacked. In this case, a disposition pattern of stowage on the pallet can be calculated in advance before performing a stacking operation. However, since the disposition pattern is determined in advance, when the articles are conveyed by a conveyor or the like, an order of conveyance of the types of the articles is required to be determined to some extent.

On the other hand, in article conveyance processes, there is a case in which an order of the types of the articles to be stacked is not determined. For example, there is a case in which the types of the articles conveyed by the conveyor are irregular. Conventional techniques have lacked an article position calculation method for suitably stacking the plurality of types of articles which is irregularly conveyed. Further, in methods according to conventional techniques, the articles are stacked preferentially in a height direction of an area for storing the articles so that there is a case in which a bottom area of combinations of the articles becomes small and the stability is low.

A stowage pattern calculation device of the present invention calculates positions of articles irregularly conveyed when the plurality of articles are disposed by a robot in a storage area determined in advance. The plurality of articles have a box shape and include articles having dimensions different from each other. The stowage pattern calculation device comprises a storage part which stores the number and dimensions with respect to each of types of the articles stacked in the storage area. The stowage pattern calculation device includes a combination calculation part which calculates a combination of the articles constituting a layer formed in the storage area and selects the layer of the articles which can be formed in the storage area based on the type of the conveyed article, a height of the layer, and an area of the layer. The stowage pattern calculation device comprises a position determination part which calculates a first probability of completion of the layer with respect to the layer selected by the combination calculation part and determines positions at which the article is stacked based on a positional relationship between the robot and the storage area and the first probability.

In the above invention, the combination calculation part can generate the combination of the articles which can be disposed in an interior of the storage area, has a constant height, and has a rectangular planar shape as the layer.

In the above invention, when a new layer is generated, the combination calculation part can select the layer to be newly generated based on an area when the new layer is planarly viewed and center gravity positions of the articles constituting the new layer.

In the above invention, the combination calculation part can obtain the number of the remaining articles not disposed in the storage area with respect to each type. The combination calculation part can calculate a second probability based on the type of the conveyed article and the number of the remaining articles with respect to each type and exclude a combination in which the second probability is no more than a predetermined judgement value.

In the above invention, the combination calculation part can obtain the number of the remaining articles not disposed in the storage area with respect to each type. The combination calculation part can select a control for stacking the conveyed article on the layer in the middle of generation, a control for creating a new layer on the layer in the middle of generation, or a control for disposition on a temporary placement place based on the type of the conveyed article and the number of the remaining articles with respect to each type.

In the above invention, when judging that there is no place at which the conveyed article is placed, the combination calculation part can divide the layer serving as a base for the layer in the middle of generation so as to generate division areas. The combination calculation part can calculate the combination of the articles constituting the layer with respect to each division area.

In the above invention, the position determination part can select positions at which the ongoing article is stacked so that a height of the articles stacked in the storage area is smaller at a position close to the robot than at a position distant from the robot. The position determination part can select a position at which the first probability is the highest among the selected positions as a position at which the article is stacked.

DETAILED DESCRIPTION

A stowage pattern calculation device according to an embodiment will be described with reference to FIG. 1 to FIG. 24. The stowage pattern calculation device according to the present embodiment is provided to a stowage system for stacking box-shaped articles upon a pallet.

Figure 1:
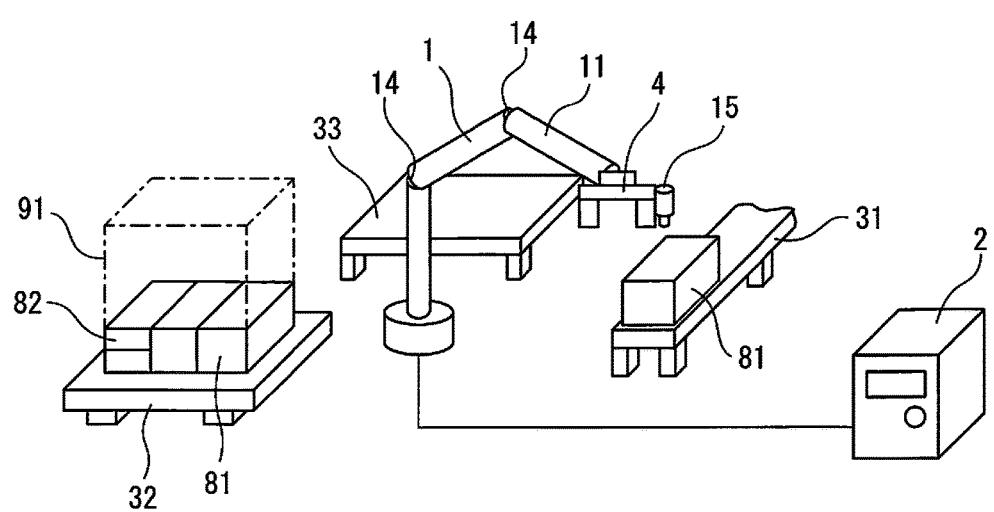
FIG. 1 is a schematic diagram of a stowage system according to an embodiment.

FIG. 1 is a schematic diagram of an article stowage system according to the present embodiment. In the present embodiment, an example in which rectangular parallelepiped boxes are stacked as the box-shaped articles will be described. The stowage system includes a hand 4 as an end effector which holds boxes 81, 82 to be conveyed and a robot 1 which disposes the hand 4 at desired position and posture. The stowage system includes a control device 2 as a robot control device which controls the robot 1.

The robot 1 according to the present embodiment is a multi-articulated robot which includes an arm 11 and a plurality of joint parts 14. The robot 1 can freely change a position and a posture of a wrist part of the arm 11. The robot 1 can dispose the boxes 81, 82 held by the hand 4 at desired position and posture.

The stowage system according to the present embodiment performs an operation of stacking the boxes conveyed by a conveyor 31 upon a pallet 32. The boxes to be stacked upon the pallet 32 are the plurality of types of boxes 81, 82 having different dimensions. On a top surface of the pallet 32, a storage area 91 in which the boxes can be stowed is set in advance. In the present embodiment, an order of the types of the boxes conveyed by the conveyor 31 is not determined, and the boxes are conveyed in an irregular order.

The stowage pattern calculation device sets positions at which the boxes 81, 82 are stowed in the interior of the storage area 91. The robot 1 disposes the boxes at the positions set by the stowage pattern calculation device. In addition, in the present embodiment, a temporary placement table 33 which provides a temporary storage place at which the boxes 81, 82 are temporarily placed is disposed.

Figure 2:
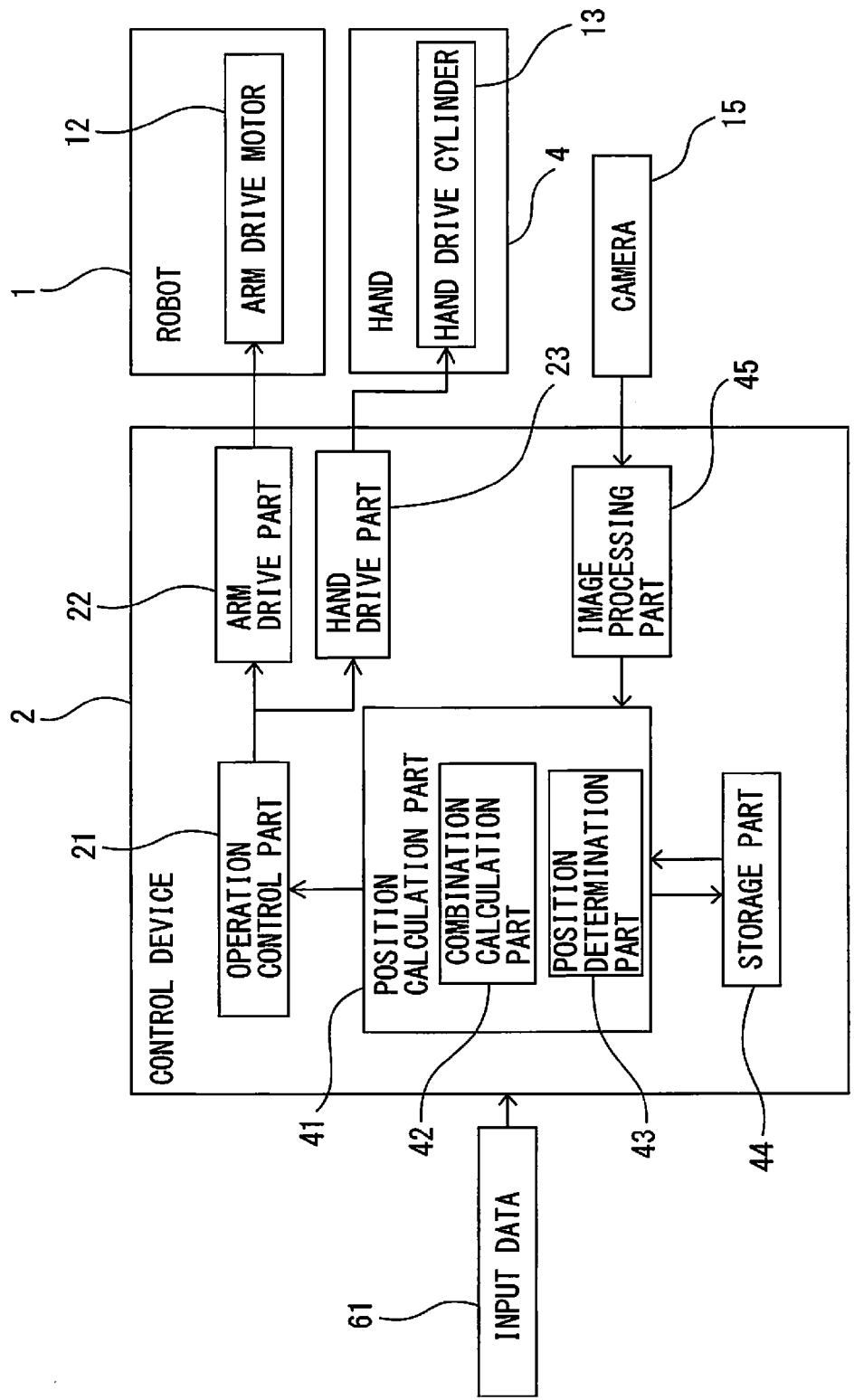
FIG. 2 is a block diagram of the stowage system according to the embodiment.

FIG. 2 shows a block diagram of the stowage system according to the embodiment. With reference to FIG. 1 and FIG. 2, the robot 1 includes an arm drive device which drives each joint part 14. The arm drive device includes an arm drive motor 12 disposed at the joint parts 14. The arm drive motor 12 is driven, whereby the arm 11 can be bent at the joint parts 14 to a desired angle. The hand 4 includes a hand drive device which closes and opens a claw part which holds the box. The hand drive device according to the present embodiment includes a hand drive cylinder 13 which drives the hand 4 by a pneumatic pressure.

The control device 2 includes an arithmetic processing device which includes a CPU (central processing part), a RAM (random access memory), and a ROM (read only memory) which are connected to each other through a bus, and the like. The control device 2 includes an operation control part 21 which transmits an operation command of the robot 1 and the hand 4. An operation program for performing a control as described below is inputted into the control device 2 according to the present embodiment. The operation control part 21 transmits the operation command for driving the robot 1 and the hand 4 based on the operation program.

The operation control part 21 transmits the operation command of driving the arm drive motor 12 to an arm drive part 22. The arm drive part 22 includes a current circuit which drives the arm drive motor 12. The arm drive part 22 supplies the arm drive motor 12 with the current based on the operation command. In addition, the operation control part 21 transmits the operation command of driving the hand drive device to a hand drive part 23. The hand drive part 23 includes a current circuit which drives an air pump. Compressed air is supplied to the hand drive cylinder 13 based on the operation command. A pressure of the air supplied to the hand drive cylinder 13 is adjusted, whereby the claw part of the hand 4 opens and closes. Note that as the end effector, an arbitrary device which can hold and release the box can be employed.

The stowage pattern calculation device according to the present embodiment includes an image capture device which detects the type of the box conveyed by the conveyor 31. The image capture device according to the present embodiment includes a camera 15 fixed to the hand 4. As the camera 15, an arbitrary camera which can detect the types of the boxes, such as a three dimensional camera, can be employed. In addition, the image capture device includes an image processing part 45 disposed in the control device 2. The image processing part 45 analyzes an image captured by the camera 15, whereby judging the type of the box conveyed by the conveyor 31.

The stowage pattern calculation device according to the present embodiment includes the control device 2. The control device 2 includes a position calculation part 41 which calculates a position at which the box is disposed in the interior of the storage area 91. Input data 61 which contains the types of the boxes stowed in the ongoing operation and the number of the boxes of each type is inputted into the position calculation part 41. The input data 61 contains a shape and dimensions of each box. A storage part 44 of the control device 2 stores the input data 61. The type of the box detected by the image processing part 45 is inputted into the position calculation part 41.

The position calculation part 41 includes a combination calculation part 42 which generates layers by calculating combinations of the boxes and further selects a layer of the boxes which can be formed in the storage area. The position calculation part 41 includes a position determination part 43 which calculates, with respect to the layer selected by the combination calculation part 42, a first probability of completion of the layer. The position determination part 43 determines a position at which the box is disposed based on a positional relationship between the robot 1 and the storage area 91 and the first probability.

Figure 3:
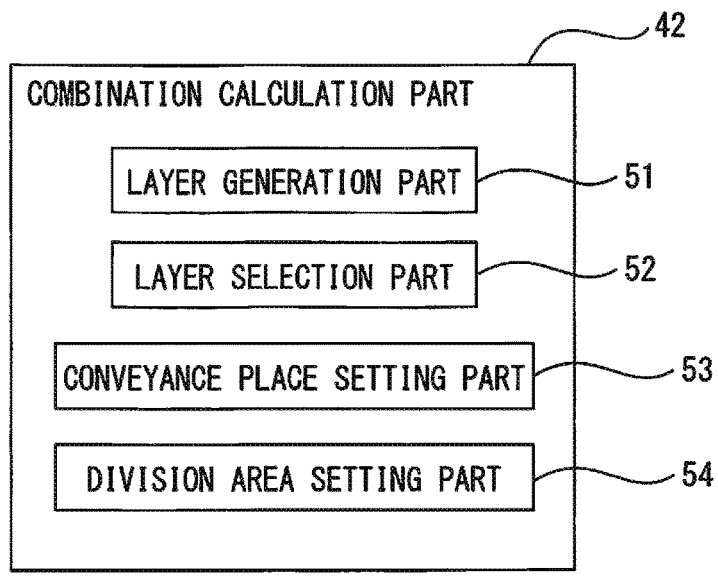
FIG. 3 is a block diagram of a combination calculation part according to the embodiment.

FIG. 3 is a block diagram of the combination calculation part according to the present embodiment. The combination calculation part 42 includes a layer generation part 51 which calculates combinations of the boxes constituting a layer formed in the storage area 91. As described below, the layer according to the present embodiment has a constant height and a rectangular planar shape, and is formed by combinations of the boxes which can be stored in the storage area 91.

The combination calculation part 42 includes a layer selection part 52 which selects a preferable layer among layers generated by the layer generation part 51 based on a predetermined condition. In addition, the combination calculation part 42 includes a conveyance place setting part 53 which determines a place to which the robot 1 conveys the box. Further, the combination calculation part 42 includes a division area setting part 54 which divides the storage area when there is no place at which the box is disposed.

Figure 4:
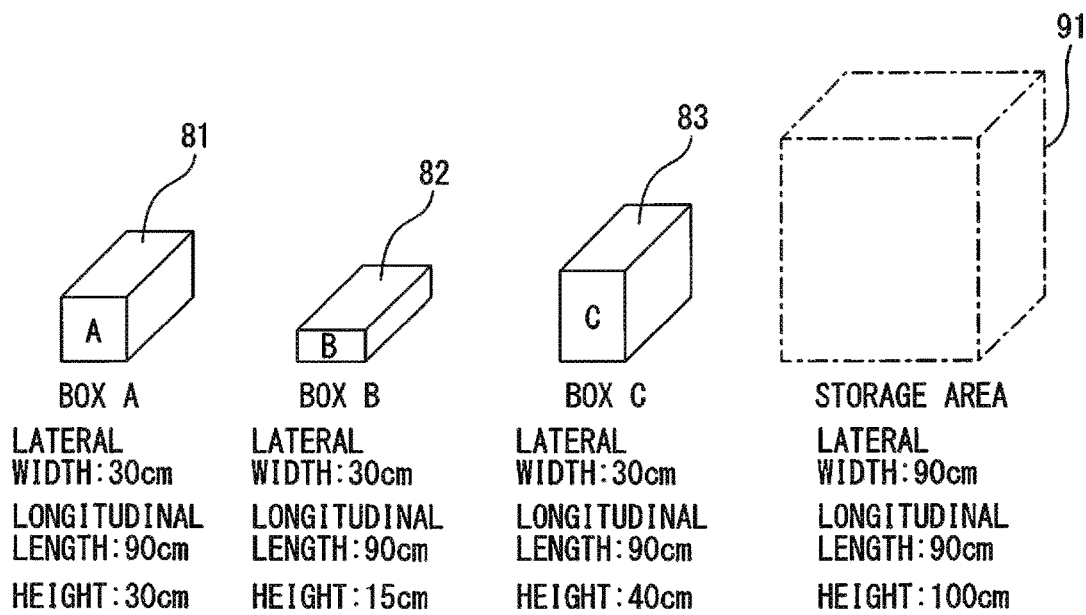
FIG. 4 is an explanatory diagram of a plurality of types of boxes and a storage area which are used for illustration in the embodiment.

FIG. 4 is an explanatory diagram of the types of boxes and the storage area which are used for illustration in the present embodiment. In the present embodiment, the box 81 as a box A, the box 82 as a box B, and a box 83 as a box C are disposed in the interior of the storage area 91. The storage area 91 is set, for example, on the top surface of the pallet 32 based on a bottom area and a height allowing the boxes to be stacked. The box A, the box B, and the box C have a rectangular parallelepiped shape. In the present embodiment, lateral widths and longitudinal lengths of the box A, the box B, and the box C are identical to each other. In the present embodiment, the description will be made by illustrating three types of boxes having heights different from each other.

Figure 5:
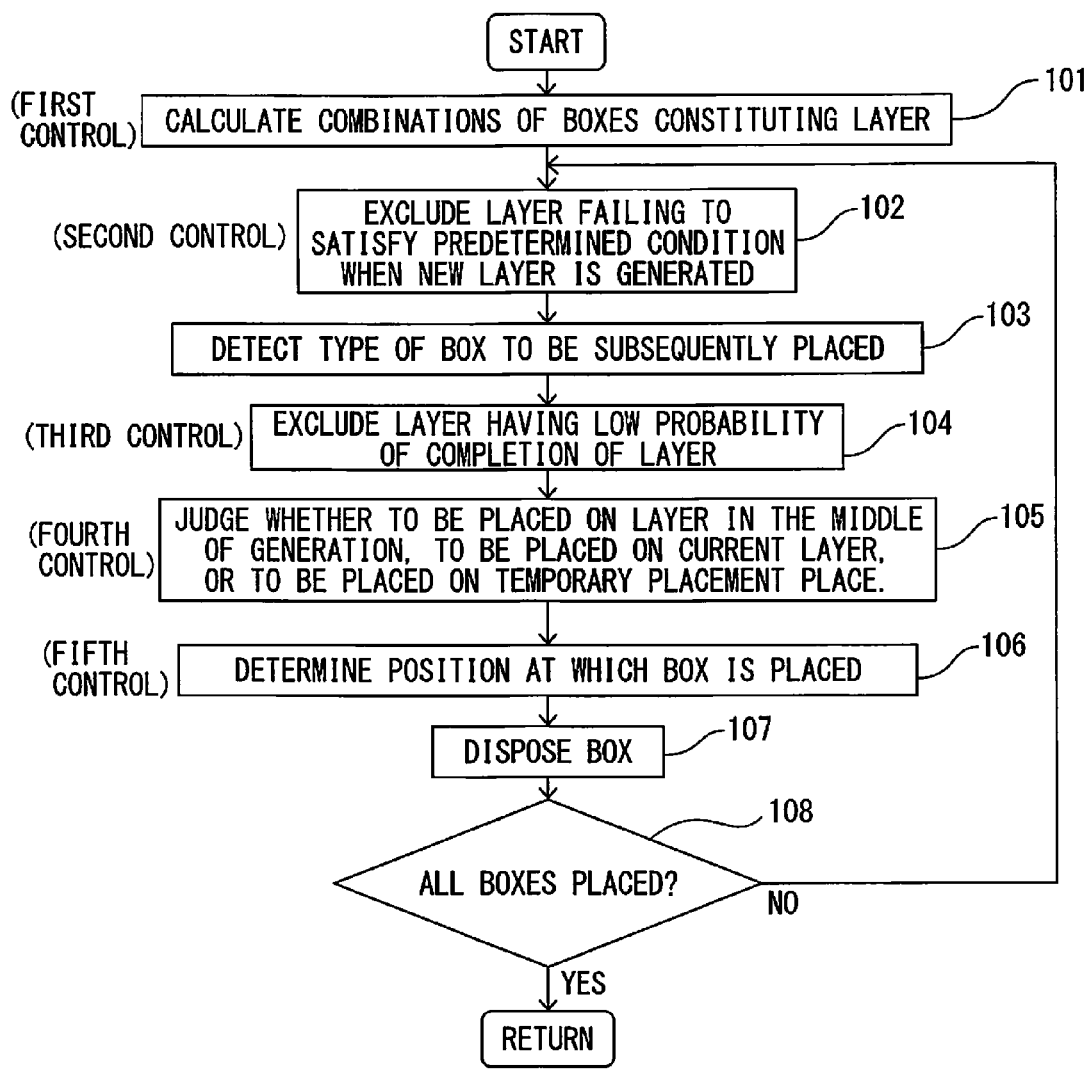
FIG. 5 is a flowchart of a control of the entirety of a pattern calculation device according to the embodiment.

FIG. 5 is a flowchart illustrating an outline of a control of the entirety of the stowage pattern calculation device according to the present embodiment. In step 101, the layer generation part 51 of the combination calculation part 42 calculates combinations of the boxes constituting a single layer. In the present embodiment, this control will be referred to as a first control. In step 102, the layer selection part 52 of the combination calculation part 42 excludes a layer failing to satisfy the predetermined condition when a new layer is generated. For example, a layer which is not contained in the storage area and protrudes out of the storage area is excluded. In the present embodiment, the control will be referred to as a second control.

Next, in step 103, the image capture device detects the type of the box conveyed by the conveyor 31. The image processing part 45 of the control device 2 transmits the type of the box to the position calculation part 41.

Next, in step 104, the layer selection part 52 calculates a second probability of completion of layers selected in step 102. Then, the layer selection part 52 excludes layers having the low second probability of completion of the layers. In the present embodiment, this control will be referred to as a third control.

Next, in step 105, the conveyance place setting part 53 of the combination calculation part 42 judges whether the box conveyed by the conveyor 31 are to be placed on a layer which is in the middle of generation, are to be disposed on a current layer and a new layer is created, or are to be placed on the temporary placement table 33. In the present embodiment, this control will be referred to as a fourth control. Next, in step 106, the position determination part 43 determines a position at which the box is disposed. In the present embodiment, this control will be referred to as a fifth control.

Next, in step 107, the position calculation part 41 transmits the operation command of disposing the box at the determined positions to the operation control part 21. Then, the operation control part 21 controls the robot 1 and the hand 4 so that the box is conveyed at the commanded positions.

In step 108, the position calculation part 41 judges whether or not all the boxes are stacked. In step 108, when there is the box conveyed by the conveyor 31 and when the box is placed on the temporary placement table 33, the control returns to step 102 and the control for determining positions is repeated. In step 108, when all the boxes are stacked in the storage area, the control terminates.

The stowage pattern calculation device according to the present embodiment performs step 101 at the beginning. The stowage pattern calculation device performs step 102 to step 108 every time the conveyed box is disposed. Next, the first control to the fifth control in the respective steps will be described in detail.

Figure 6:
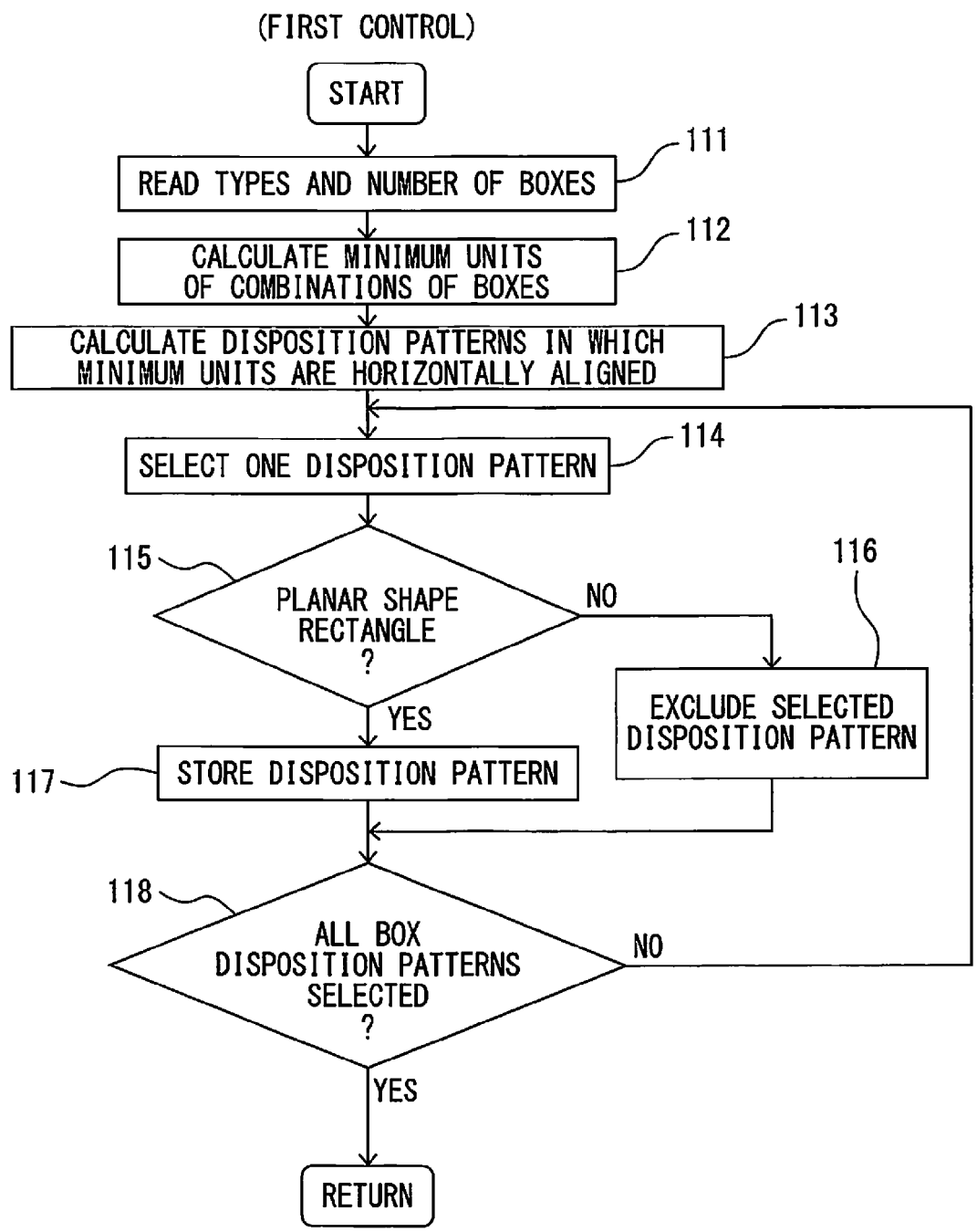
FIG. 6 is a flowchart of a first control according to the embodiment.

FIG. 6 is a flowchart of the first control according to the present embodiment. The first control is performed by the layer generation part 51 of the combination calculation part 42. In step 111, the layer generation part 51 reads the types and the number of the boxes from the storage part 44. In step 112, the layer generation part 51 calculates minimum units of box combinations. Herein, the description will be made by illustrating a case in which three of the box A, six the box B, and three of the box C are stowed in the storage area 91.

Figure 7:
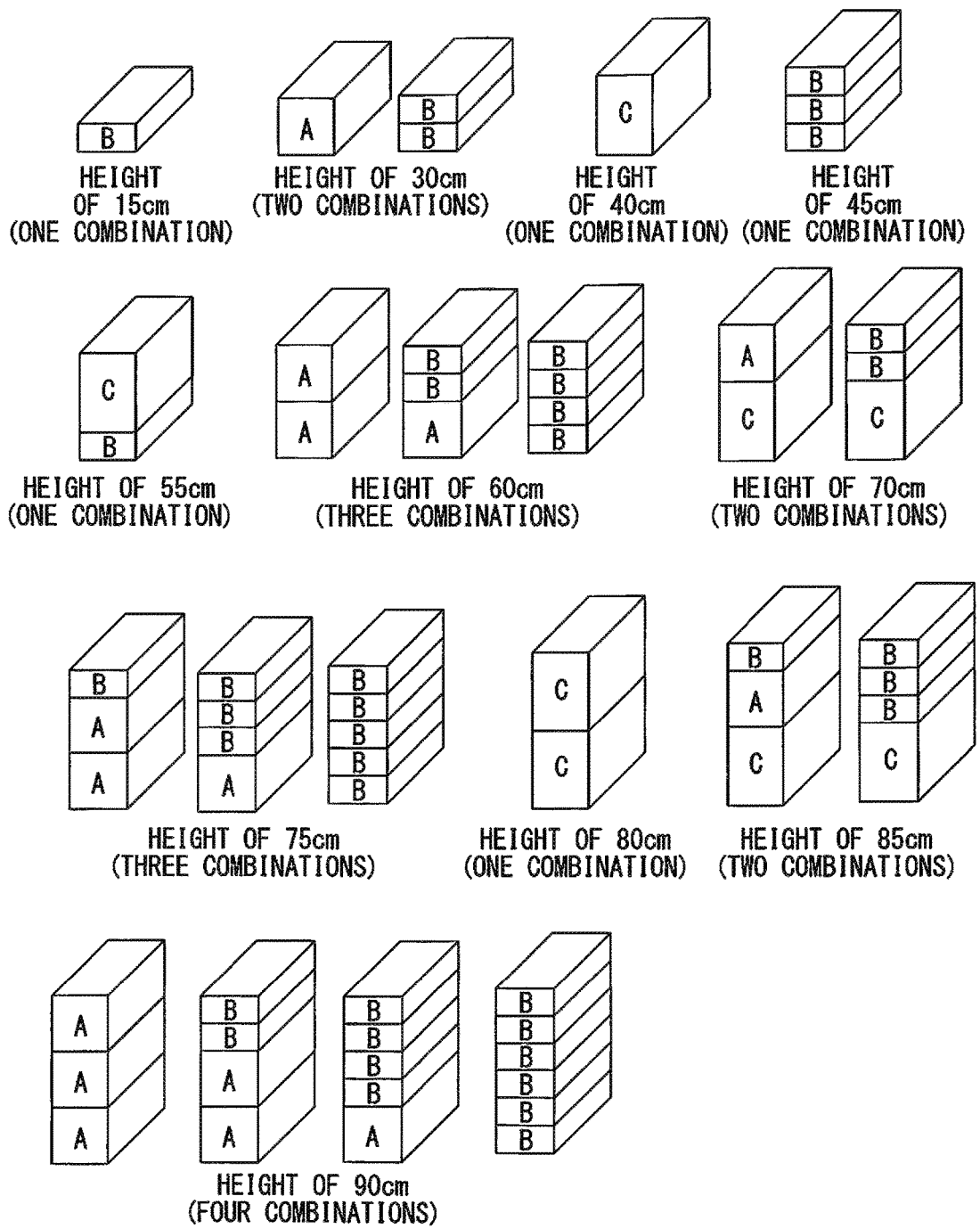
FIG. 7 is a perspective view illustrating combinations of the boxes of minimum units according to the embodiment.

In FIG. 7, the minimum units of box combinations which are formed with respect to each height are illustrated. The minimum unit of box combinations is created by combining at least one box. The minimum unit has a size allowing disposition in the interior of the storage area 91. In addition, the minimum unit is a box combination allowing a height to be constant. In other words, the minimum unit is a box combination allowing a top surface to have a planar shape. Further, the minimum unit is a box combination allowing a bottom area to be minimum.

In the present embodiment, since in the plurality of types of the box A, the box B, and the box C, the lateral widths and the longitudinal lengths are identical, box combinations in which the plurality of boxes are stacked in a height direction serve as the minimum units. For example, there is one piece of the minimum unit having a height of 15 cm, there are two of the minimum units having a height of 30 cm, and there are four of the minimum units having a height of 90 cm.

The layer generation part 51 can, for example, calculate all the combinations and select combinations satisfying conditions as described above. Note that when the number of the boxes aligned in the height direction is identical with respect to each type, the minimum units according to the present embodiment are considered to be the single minimum unit. For example, with respect to the minimum unit having a height of 55 cm, a combination in which the box C is disposed above the box B and a combination in which the box B is disposed on the box C are not distinguished but considered to be the single minimum unit.

With reference to FIG. 6, next, in step 113, the layer generation part 51 generates disposition patterns in which the minimum units are aligned in a horizontal direction. The layer generation part 51 aligns the minimum units having the same height in such a manner as to be capable of disposing the same in the interior of the storage area 91. In other words, the layer generation part 51 generates the disposition patterns in such a manner that a top surface has a planar shape. In addition, the layer generation part 51 generates such disposition patterns as not to exceed a total number of the boxes with respect to each type.

Next, in step 114, the layer generation part 51 selects one disposition pattern among the disposition patterns calculated in step 113. In step 115, the layer generation part 51 judges whether or not the planar shape of the selected disposition pattern is rectangular. When the planar shape of the selected disposition pattern is not rectangular, the layer generation part 51 proceeds to step 116 and excludes the selected disposition pattern.

When the planar shape of the selected disposition pattern is rectangular in step 115, in step 117, the selected disposition is stored in the storage part 44 as one layer.

Next, in step 118, the layer generation part 51 judges whether or not all the disposition patterns have been selected. In step 118, when all the disposition patterns have been selected, the control terminates. In step 118, when at least one of the disposition patterns has not been selected and the disposition patterns remain, the control returns to step 114. Then the layer generation part 51 repeats the similar control. Thus, in the first control, the layer generation part 51 calculates the disposition patterns using the plurality of minimum units and generates layers (reference layers) which serve as a reference for box disposition patterns.

Figure 8:
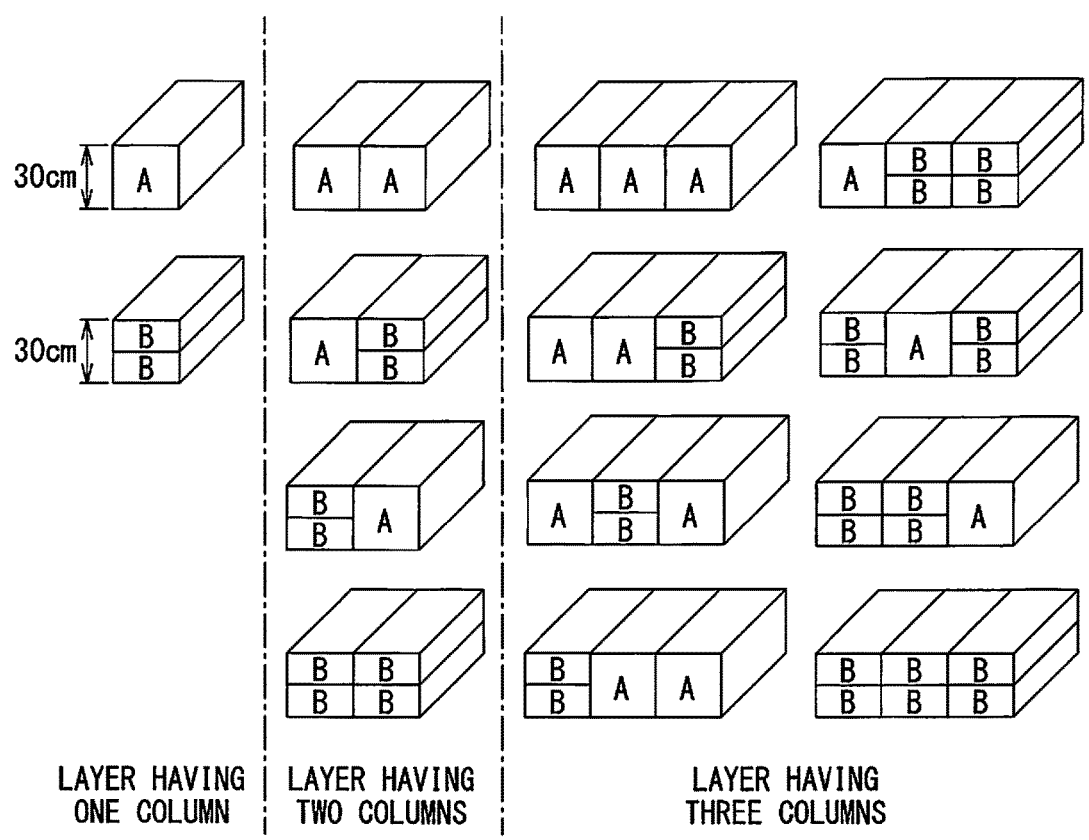
FIG. 8 is a perspective view of a layer having a height of 30 cm which is generated in a layer generation part.
Figure 9:
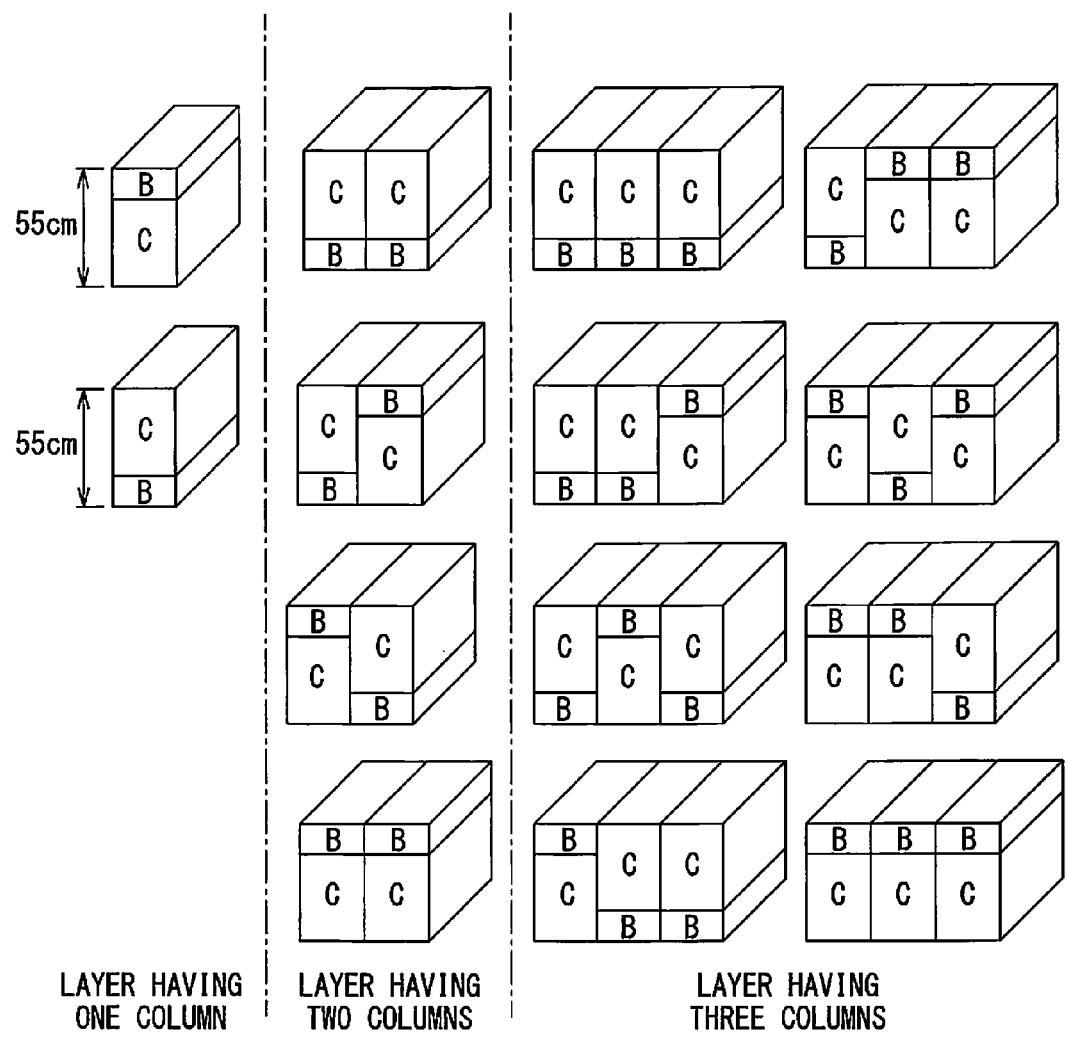
FIG. 9 is a perspective view of a layer having a height of 55 cm which is generated in the layer generation part.

In FIG. 8 and FIG. 9, examples of the layers formed by combining the minimum units are illustrated. In FIG. 8, the layers having a height of 30 cm are illustrated.

In FIG. 9, the layers having a height of 55 cm are illustrated. For example, the layers having a height of 30 cm in FIG. 8 include the layers having one column of the boxes, the layers having two columns of the boxes, and the layers having three columns of the boxes. The layers having a height of 55 cm in FIG. 9 also include the layers having one column of the boxes, the layers having two columns of the boxes, and the layers having three columns of the boxes. Further, a plurality of types of layers such as the layers having a height of 15 cm and the layers having a height of 40 cm are formed. Each layer has a size allowing disposition in the interior of the storage area 91. The layers do not exceed a total number of the stacked boxes with respect to each type of the boxes. In addition, in each layer, the planar shape is rectangular.

Note that, in step 113, when the layers are calculated by combining the minimum units, the disposition patterns different in an order of the types of the boxes in the height direction are also calculated as one layer. For example, in the layers having one column of the boxes in FIG. 9, the layer in which the box C is disposed on the box B and the layer in which the box B is disposed on the box C are calculated as the layers different from each other. All the layers as thus created are stored in the storage part 44.

Figure 10:
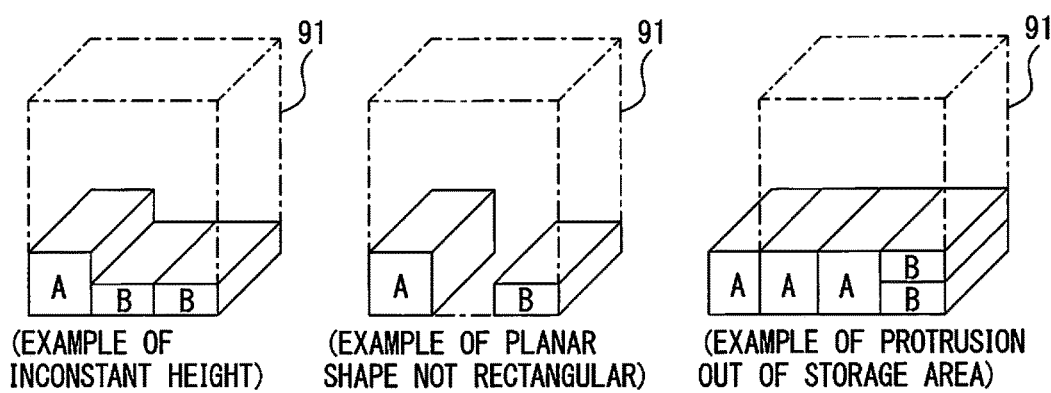
FIG. 10 is a perspective view of box combinations excluded by the layer generation part.

In FIG. 10, examples of box combinations failing to be calculated as the layers are illustrated. The layer generation part 51, for example, excludes combinations in which a height is inconstant when the minimum units are aligned in the horizontal direction. In other words, the layer generation part 51 excludes combinations in which a top surface has a level difference. Further, the layer generation part 51 excludes combinations in which the minimum units are separately disposed so that the planar shape fails to be rectangular. Further, the layer generation part 51 excludes combinations failing to be disposed in the interior of the storage area 91. In the present embodiment, the minimum units are combined to generate the layers, but this configuration is not limitative and the layers can be generated by an arbitrary control.

Figure 11:
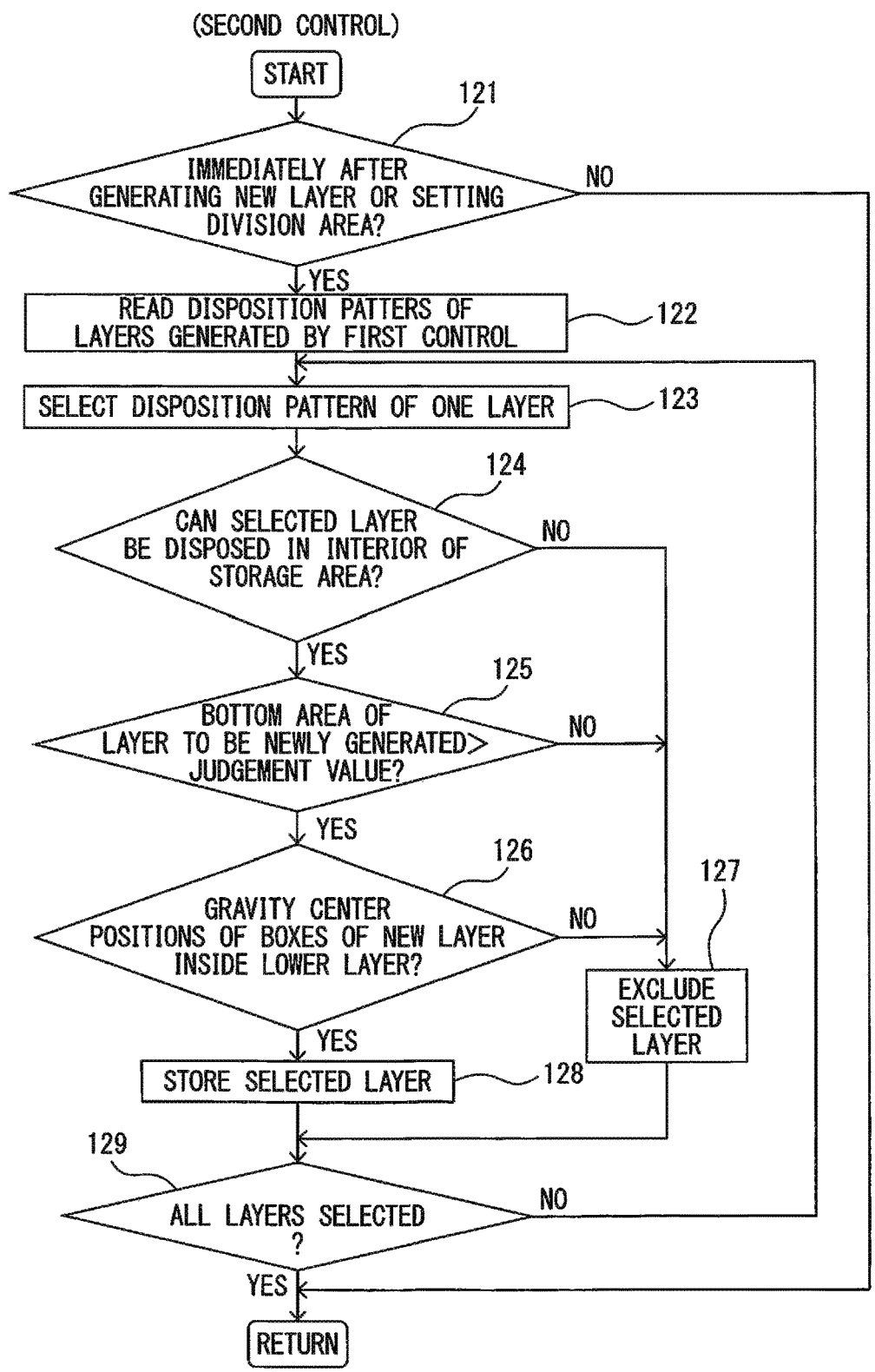
FIG. 11 is a flowchart of a second control according to the embodiment.

FIG. 11 is a flowchart of the second control according to the present embodiment. In the second control, the layer selection part 52 performs a control for selecting the layers created by the layer generation part 51. In step 121, the layer selection part 52 judges whether or not an ongoing operation of stacking the box is a case of generating a new layer or a case immediately after setting a division area as described below. For example, a case of disposing the first box in the storage area 91 corresponds to the case of generating a new layer. In addition, a case of disposing the box on a layer in the middle of generation and a case of disposing the box on the completed layer correspond to the case of generating a new layer. In step 121, when the case of creating a new layer or the case immediately after setting the division area is not applicable, the control terminates. In step 121, when there is the case of creating a new layer or the case immediately after setting the division area, the control proceeds to step 122.

In step 122, the layer selection part 52 reads the disposition patterns generated by the first control. In step 123, the layer selection part 52 selects the disposition pattern of one layer.

In step 124, the layer selection part 52 judges whether or not the disposition pattern of the selected layer can be disposed in the interior of the storage area 91. In other words, the layer selection part 52 judges whether or not the disposition pattern protrudes out of the storage area. In step 124, when disposition cannot be made in the interior of the storage area, the selected layer is excluded in step 127. For example, when a new layer is created on the plurality of completed layers, a new layer may exceed a top surface of the storage area. In this case, the selected layer is excluded. In step 124, when the selected layer can be disposed in the interior of the storage area, the control proceeds to step 125.

In step 125, the layer selection part 52 judges whether or not a bottom area of a layer to be newly created (selected layer) is greater than an area judgement value. In other words, whether or not an area when the layer to be newly created is planarly viewed is greater than the area judgement value is judged. The judgement value herein can be determined in advance. As the judgement value, for example, a value in which a bottom area of the storage area 91 is multiplied by a predetermined ratio can be set.

In the present embodiment, the judgement value is set so that a bottom area of the layer is close to the bottom area of the storage area 91. As the judgement value, for example, 80% of the bottom area of the storage area 91 can be set. In this case, in the examples of FIG. 8 and FIG. 9, the layers in which the boxes are aligned in three columns remain. Alternatively, as the judgement value, 50% of the bottom area of the storage area 91 can be set. In this case, the layers in which the boxes are aligned in two columns and the layers in which the boxes are aligned in three columns remain. When judgement in step 125 is denied, shift to step 127 is made and the selected layer is excluded. When judgement in step 125 is affirmed, the control proceeds to step 126.

In step 126, the layer selection part 52 judges whether or not when planarly viewed, gravity center positions of the boxes included in the layer to be newly created (selected layer) are inside an area of a lower layer. When a new layer is created, the boxes serving as a base may not be disposed below each box. In addition, a part of the new layer may protrude out of the lower layer serving as the base. Step 126 is performed in order to allow the new layer to be a stable layer. In step 126, when a gravity center position of even one box fails to be inside the area of the lower layer, the control proceeds to step 127. In step 127, the selected layer is excluded.

In step 126, when gravity center positions of all the boxes of the new layer are inside the area of the lower layer, the control proceeds to step 128. In step 128, the selected layer is stored in the storage part 44 as the layer selected by the second control. Note that in step 126, when the bottommost first layer is generated in the storage area, gravity center positions of all the boxes of the new layer are determined to be inside the area of the lower layer.

Next, in step 129, it is judged whether or not all the layers generated by the first control have been selected. When judgement in step 129 is denied, the control returns to step 123, a subsequent layer is selected and the similar control is performed. In step 129, when all the layers have been selected, the control terminates. The storage part 44 stores the disposition patterns of the layers selected by the second control.

Figure 12:
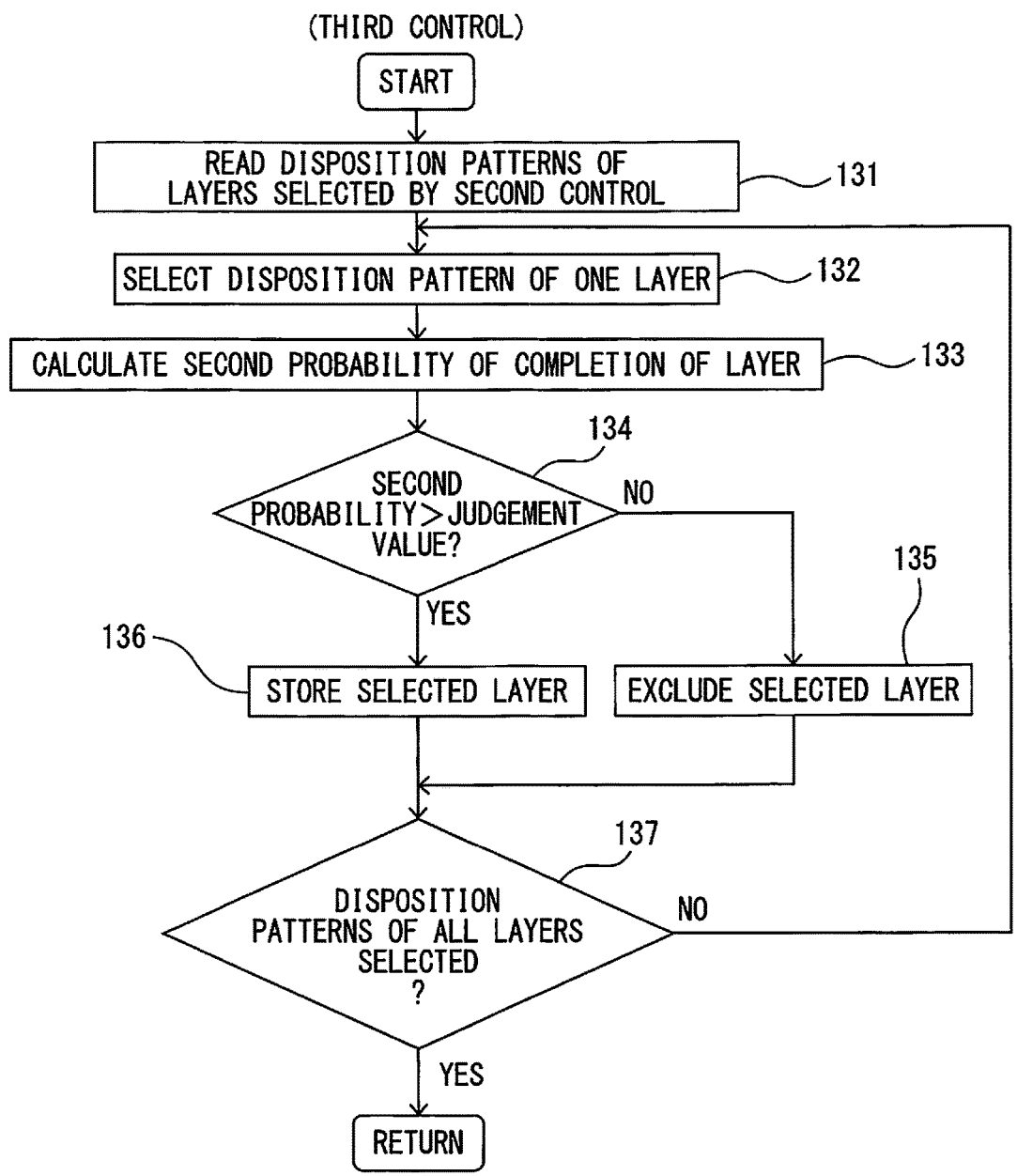
FIG. 12 is a flowchart of a third control according to the embodiment.

FIG. 12 is a flowchart of the third control according to the present embodiment. In the third control, the layer selection part 52 calculates a probability of completion of each layer and excludes layers having a low probability of completion.

In step 131, the layer selection part 52 reads the disposition patterns of the layers selected by the second control. In step 132, the layer selection part 52 selects one layer. In step 133, the layer selection part 52 calculates the second probability of completion of the selected layer.

Figure 13:
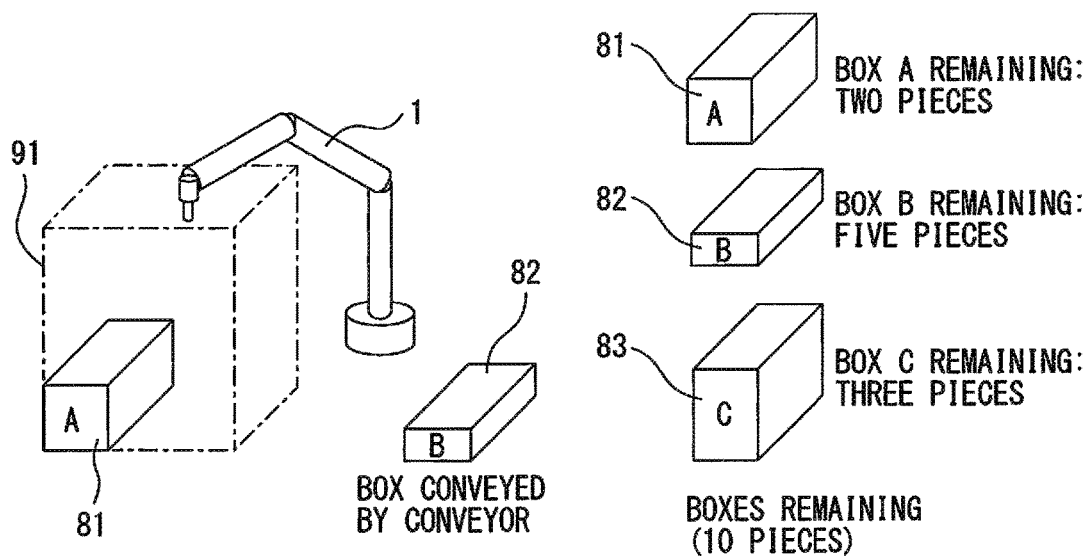
FIG. 13 is a diagram of a current state of a system for illustration of the third control according to the embodiment.

FIG. 13 is an explanatory diagram of a current state of a system for illustration of a method of calculating the second probability in the third control. In examples as illustrated in FIG. 13, one piece of the box A is disposed in the interior of the storage area 91. Then, the box B is conveyed by the conveyor 31. The remaining boxes are two of the box A, five of the box B, and three of the box C. In other words, 10 boxes in total remain without being conveyed by the conveyor 31.

Figure 14:
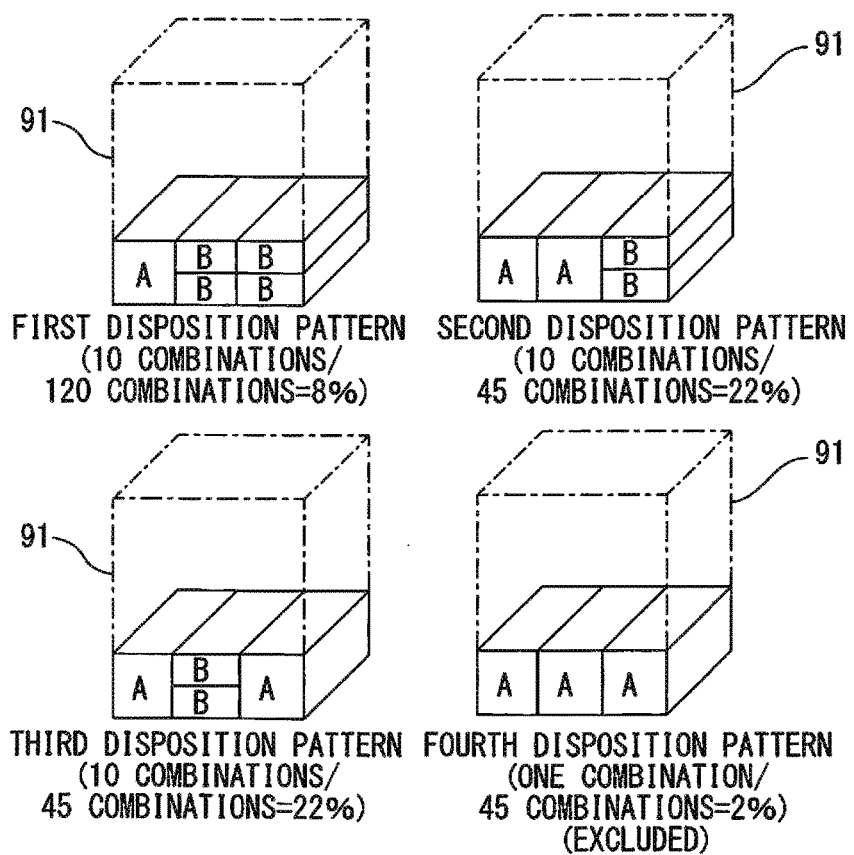
FIG. 14 is a perspective view of disposition patterns of a layer selected in the second control.

In FIG. 14, the disposition patterns of the layers selected by the second control are illustrated. In examples herein, in step 125 of the second control (see FIG. 11), only the layers having three columns remain. For example, the layer selection part 52 selects the layers in which the box A is disposed at a left end among the layers having a height of 30 cm as illustrated in FIG. 8. The layer selection part 52 selects a first disposition pattern to a fourth disposition pattern. The layer selection part 52 obtains the number of the remaining boxes not disposed in the storage area 91 with respect to each type. The layer selection part 52 calculates the probability of completion of each layer (second probability) based on the types of the box to be disposed in the ongoing operation and the number of the remaining boxes with respect to each type.

The probability on this occasion is a probability in which after the box to be disposed in the ongoing operation is disposed in the storage area 91, the boxes required to complete the layer are successively conveyed.

For example, in a case of the layer of the first disposition pattern, the box B is conveyed by the conveyor 31. Accordingly, three of the box B among the remaining boxes are required to be successively conveyed. The probability on this occasion is $(_5C_3)/(_{10}C_3)$. In other words, the probability is (10 combinations)/(120 combinations)=8%. Also in the second disposition pattern to the fourth disposition pattern, the probability can be calculated by a similar process.

Note that when the box is temporarily disposed on the temporary placement table 33, a probability of completion of the layer can be calculated based on the box disposed on the temporary placement table 33 and the box conveyed by the conveyor 31. In addition, when a new layer is formed on a layer in the middle of generation, it is assumed that the layer in the middle of generation is completed. Then, when the conveyed box is disposed on the completed layer, a probability of completion of the new layer is calculated. In this case, when there are plurality of candidates for the layer in the middle of generation, probabilities of completion of the new layer with respect to all the candidates are calculated.

With reference to FIG. 12, next, in step 134, the layer selection part 52 judges whether or not the calculated probability is greater than a predetermined judgement value with respect to the selected layer. This judgement value can be set in advance by an operator. In step 134, when the calculated probability is no more than the predetermined judgement value, the control proceeds to step 135. In step 135, the selected layer is excluded. In other words, the selected layer is excluded from the candidates. With reference to FIG. 14, for example, when the judgement value of the second probability is set to be 5%, the layer of the fourth disposition pattern is excluded.

With reference to FIG. 12, in step 134, when the calculated probability is greater than the judgement value, the control proceeds to step 136. In step 136, the storage part 44 stores the disposition pattern of the layer selected by the third control.

Next, in step 137, the layer selection part 52 judges whether or not the disposition patterns of all the layers have been selected. In step 137, when at least one of the layers has not been selected, the control returns to step 132 and the similar control is repeated. In step 137, when all the layers have been selected, the control terminates. In the storage part 44, the disposition patterns of the layers selected by the third control are stored.

Thus, in the present embodiment, a probability of completion of a layer is calculated with respect to a disposition pattern of the layer. Then, a layer having the low probability is excluded from candidates. Thus, the layer selection part 52 performs an operation of narrowing candidates of a layer. The control allows box to be disposed at positions at which the probability of completion of a layer is high. As a result, a large number of boxes can be disposed in a storage area and an impossibility of disposing all the boxes in the storage area can be suppressed.

Figure 15:
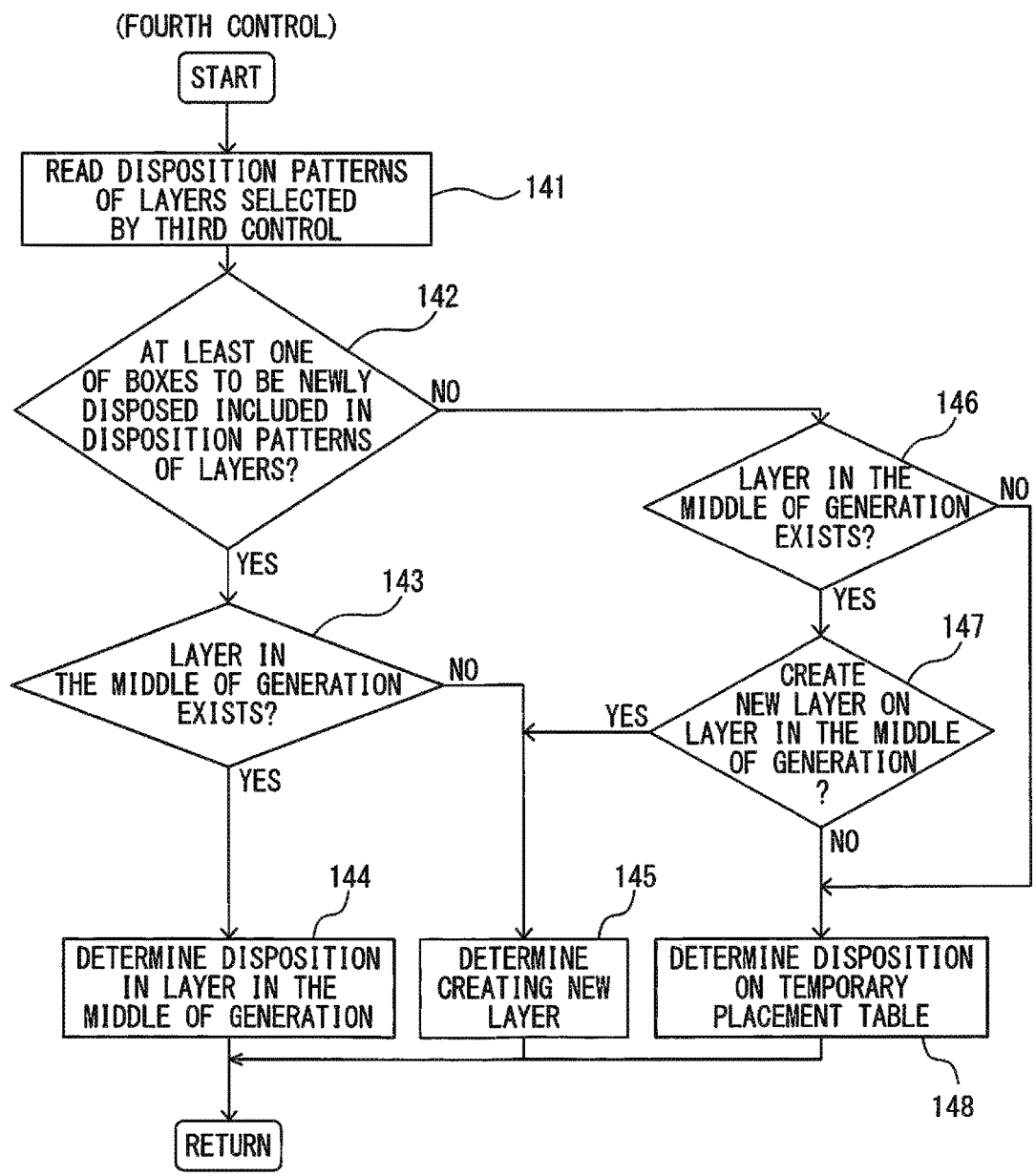
FIG. 15 is a flowchart of a fourth control according to the embodiment.

FIG. 15 is a flowchart of the fourth control according to the present embodiment. In the fourth control, the conveyance place setting part 53 determines a place to which the box is conveyed.

In step 141, the conveyance place setting part 53 reads the layers selected by the third control. Next, in step 142, the conveyance place setting part 53 judges whether or not at least one box to be newly disposed is included in the disposition patterns of the selected layers. When there remains the plurality of layers, the conveyance place setting part 53 judges whether or not at least one box to be disposed in the ongoing operation is included in an order from those having a lower height. In step 142, when at least one box to be disposed in the ongoing operation is included in the disposition patterns of the selected layers, the control proceeds to step 143.

In step 143, the conveyance place setting part 53 judges whether or not there exists a layer in the middle of generation. For example, when one layer is completed, there is a case in which there is no layer in the middle of generation. In addition, when the division area is set, there is a case in which there is no layer in the middle of generation. In step 143, when there is a layer in the middle of generation, the control proceeds to step 144. Then, in step 144, the conveyance place setting part 53 determines that the box is disposed in the layer in the middle of generation. Positions at which the box is disposed will be determined in the subsequent fifth control.

In step 143, when there does not exist a layer in the middle of generation, the control proceeds to step 145. In step 145, the conveyance place setting part 53 determines to generate a new layer. The position of the box in the new layer will be determined in the subsequent fifth control.

In step 142, when the box to be disposed in the ongoing operation is not included in the disposition patterns of the layers selected by the third control, the control proceeds to step 146. In step 146, it is judged whether or not there exists a layer in the middle of generation. In step 146, when there does not exist a layer in the middle of generation, the control proceeds to step 148. In step 148, the conveyance place setting part 53 determines to dispose the box on the temporary placement table 33.

In step 146, when there is a layer in the middle of generation, the control proceeds to step 147. In step 147, it is judged whether or not to generate a new layer on the layer in the middle of generation. In the control herein, the layer being currently created is assumed to be completed, and a probability of completion of a new layer is determined when the box to be disposed in the ongoing operation is disposed on the completed layer. The second control and the third control are performed based on the type of the box conveyed by the conveyor and the number of the boxes with respect to each type after the layer being currently created is completed. Thus, when the current layer is completed, the second probability of completion of a new layer is calculated. When there is a layer in which the calculated probability is greater than a predetermined judgement value, the control proceeds to step 145. In other words, the conveyance place setting part 53 determines to generate a new layer on the layer in the middle of generation. When there is no layer in which the calculated probability is greater than the predetermined judgement value, the control proceeds to step 148, and the conveyance place setting part 53 determines to dispose the box on the temporary placement table 33. Thus, the conveyance place setting part 53 sets a place at which the conveyed box is to be disposed.

Figure 16:
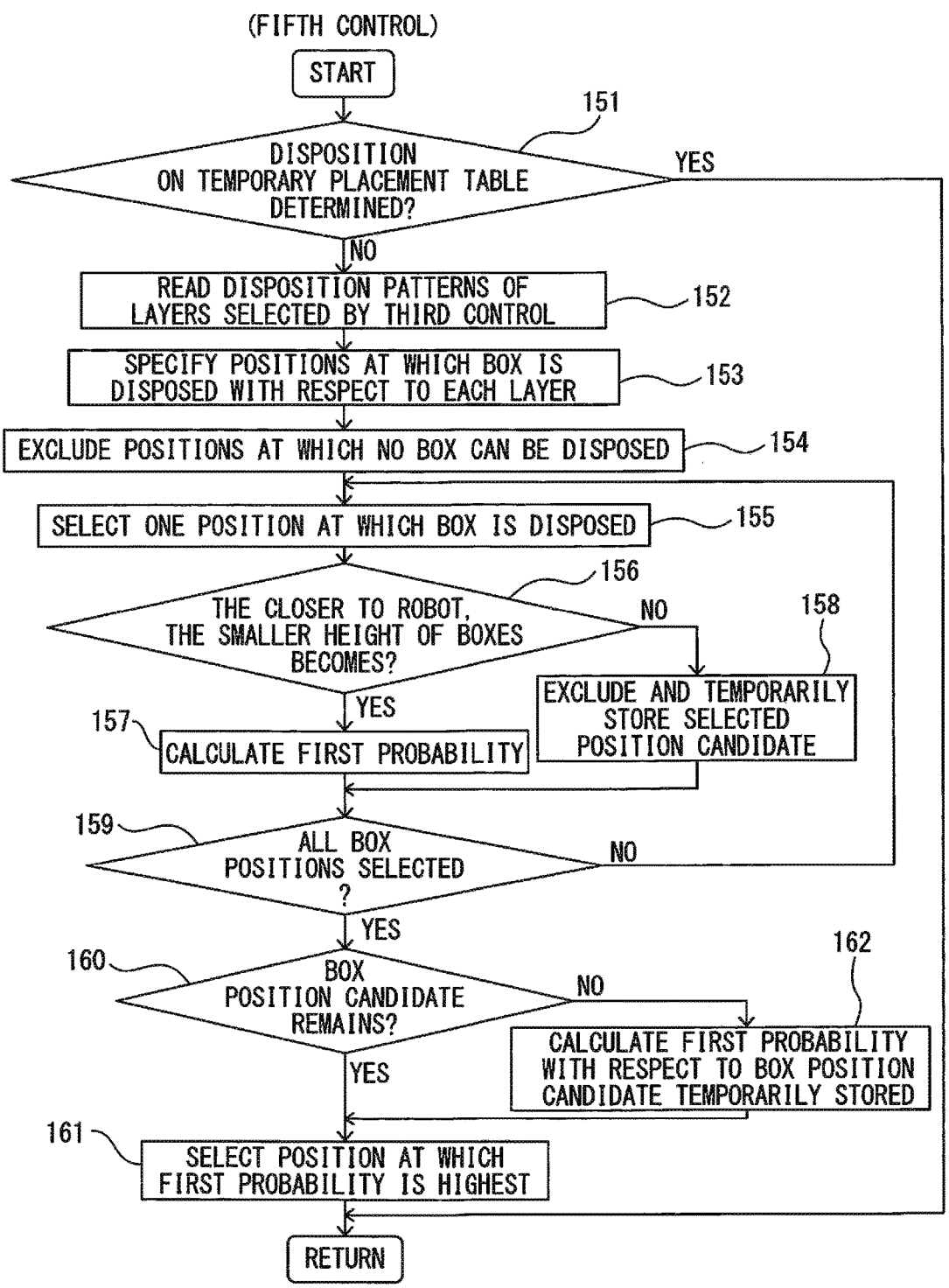
FIG. 16 is a flowchart of a fifth control according to the embodiment.

FIG. 16 is a flowchart of the fifth control according to the present embodiment. By the controls up to the fourth control, the layers to be preferably formed are selected. Alternatively, disposing the box on the temporary placement table 33 is determined. In the fifth control, the position determination part 43 determines positions at which the box is finally disposed based on the layers selected by the layer selection part 52.

In step 151, the position determination part 43 judges whether or not disposing the conveyed box on the temporary placement table 33 is determined in the fourth control. When disposing the conveyed box on the temporary placement table 33 is determined, the control terminates. In the fourth control, when disposition on the layer in the middle of generation is determined or when creating a new layer is determined, the control proceeds to step 152.

In step 152, the position determination part 43 reads the position patterns of the layers which are generated by the third control. In step 153, the position determination part 43 specifies positions at which the box is disposed with respect to each layer. In other words, candidates for positions at which the box is disposed in the ongoing operation are calculated.

Figure 17:
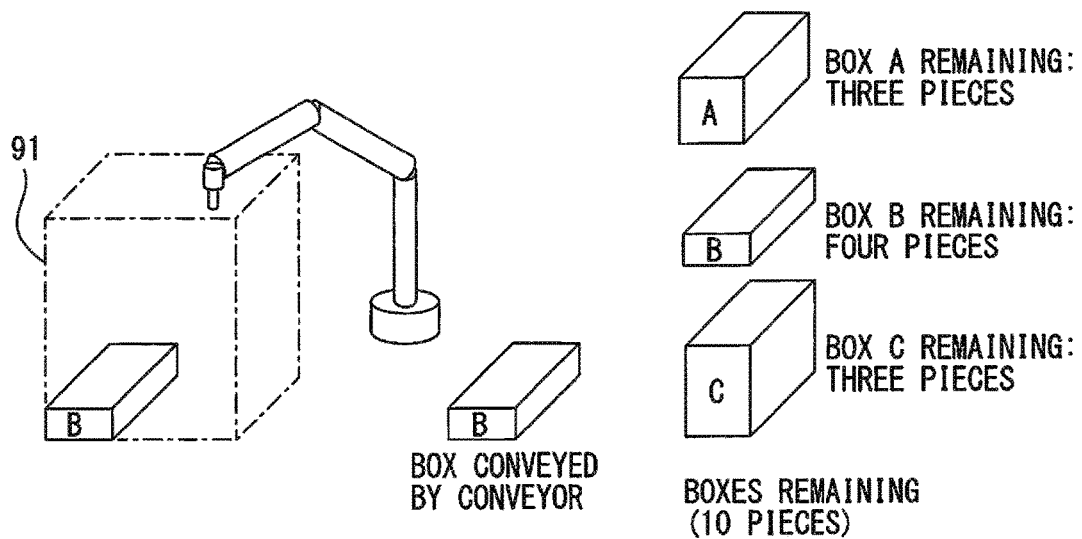
FIG. 17 is a diagram of a current state of the system for illustration of the fifth control according to the embodiment.

FIG. 17 shows an explanatory diagram of a current state of the system for illustration of the fifth control. In this state, one piece of the box B is disposed in the storage area 91. The box B is conveyed by the conveyor 31. Then, the remaining boxes are three of the box A, four of the box B, and three of the box C. In other words, 10 boxes remain without being conveyed by the conveyor.

Figure 18:
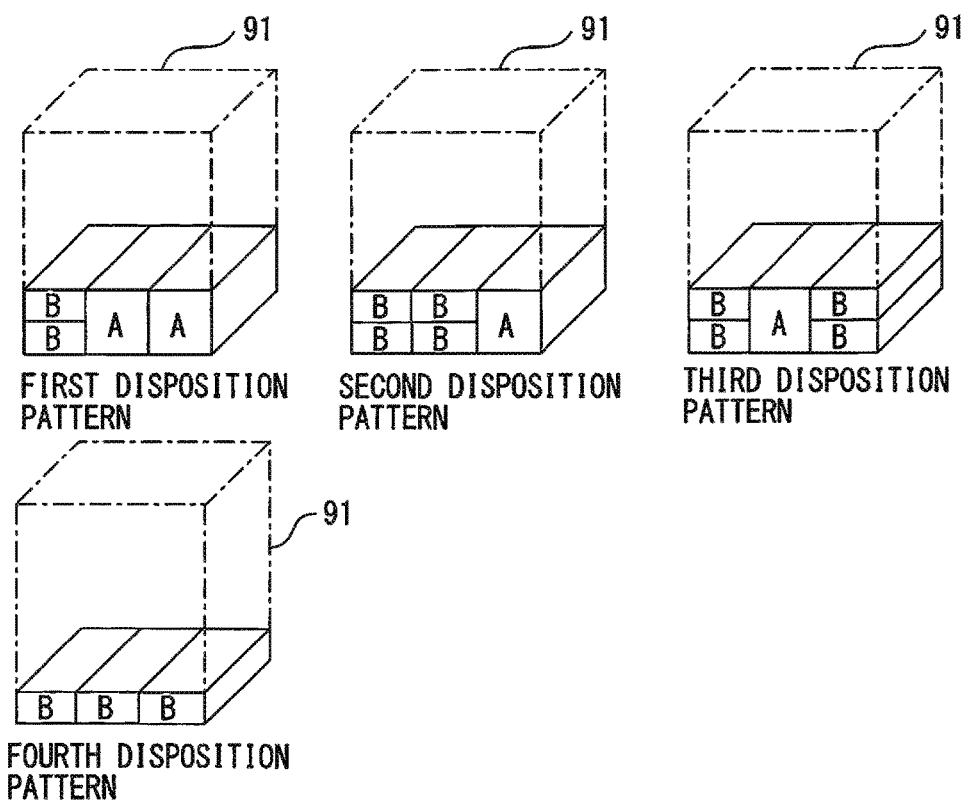
FIG. 18 is a perspective view of disposition patterns of layers selected in the fourth control.
Figure 19:
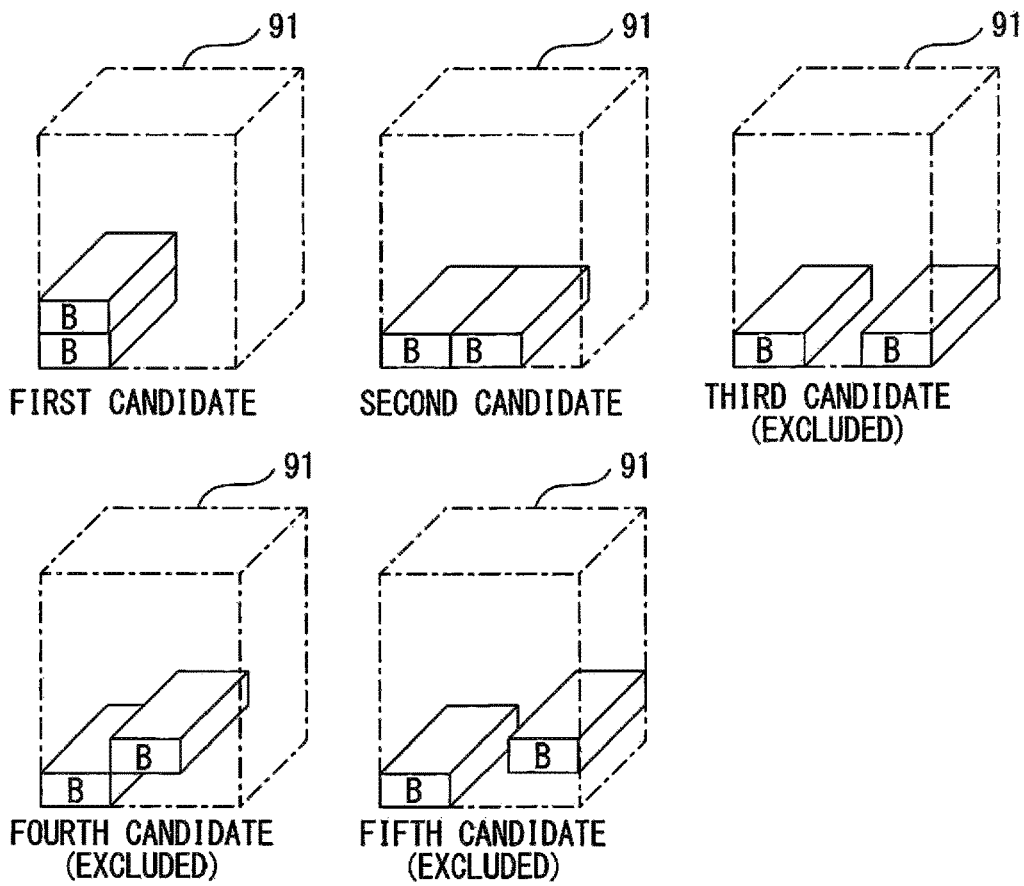
FIG. 19 is a perspective view of candidates for positions of the box to be disposed in an ongoing operation.

FIG. 18 shows a perspective view of the disposition patterns of the layers selected by the layer selection part. In the example, the first disposition pattern to the fourth disposition pattern are selected. FIG. 19 shows an explanatory diagram of candidates for positions at which the box conveyed by the conveyor can be disposed. In the example, positions of the first candidate to the fifth candidate are specified. The position determination part 43 calculates the candidates for positions of the box with respect to the first disposition pattern to the fourth disposition pattern. Each candidate corresponds to a position of the box B in the first disposition pattern to the fourth disposition pattern.

With reference to FIG. 16, in step 154, the position determination part 43 excludes positions at which the box cannot be disposed. With reference to FIG. 19, in the fourth candidate and the fifth candidate, the box B cannot be disposed since there exists no box serving as a base. The position determination part 43 excludes the fourth candidate and the fifth candidate and leaves the first candidate to the third candidate. Thus, the position determination part 43 excludes positions at which box cannot be disposed based on a state of the boxes stacked in the interior of the storage area.

Next, in step 155, the position determination part 43 selects the candidate for one position at which the box is disposed. In step 156, the position determination part 43 judges whether or not when the box is disposed at the selected position, the closer to the robot 1, the smaller a height of the stacked boxes becomes.

As illustrated in FIG. 17, the robot 1 is disposed on a right side of the storage area 91. In the first candidate and the second candidate as illustrated in FIG. 19, the closer to the robot, a height of the boxes becomes smaller. On the other hand, in the third candidate, the boxes B are disposed at end portions on both sides in a width direction of the storage area 91. A recessed part is formed at the middle in the width direction. Consequently, there is a part at which the closer to the robot 1, a height of the boxes becomes greater. For example, when selecting two boxes adjacent to each other in the width direction, the position determination part 43 judges whether or not there is a part at which a height of the box close to the robot is greater than a height of the box distant from the robot 1. The position determination part 43 judges that in the third candidate there is a part at which the closer to the robot 1, the greater a height of the box becomes.

In step 156, when there is a part at which the closer to the robot 1, the greater a height of the box becomes, the control proceeds to step 158. In step 158, the storage part 44 excludes the selected candidate for the position of the box and then temporarily stores the excluded layer. For example, when the third candidate in FIG. 19 is selected, the third candidate is excluded and temporarily stored in the storage part 44.

If the boxes in an area close to the robot 1 are high, when the robot is driven, an operation to avoid a high part is required. In other words, the robot is required to dispose the box at a deep position beyond the high part. Consequently, a control of the robot becomes complicated and a long time is required. In the present embodiment, the control for preferentially disposing the box at a distant part rather than a part close to the robot 1 is performed. By performing this control, an operation time of the robot 1 can be reduced and a position of the box which facilitates the control of the robot can be selected.

With respect to the selected position candidate, when judgement in step 156 is affirmed, the control proceeds to step 157. In step 157, the position determination part 43 calculates the first probability of completion of a layer based on the position at which the box is disposed and the number of remaining boxes with respect to each type.

Figure 20:
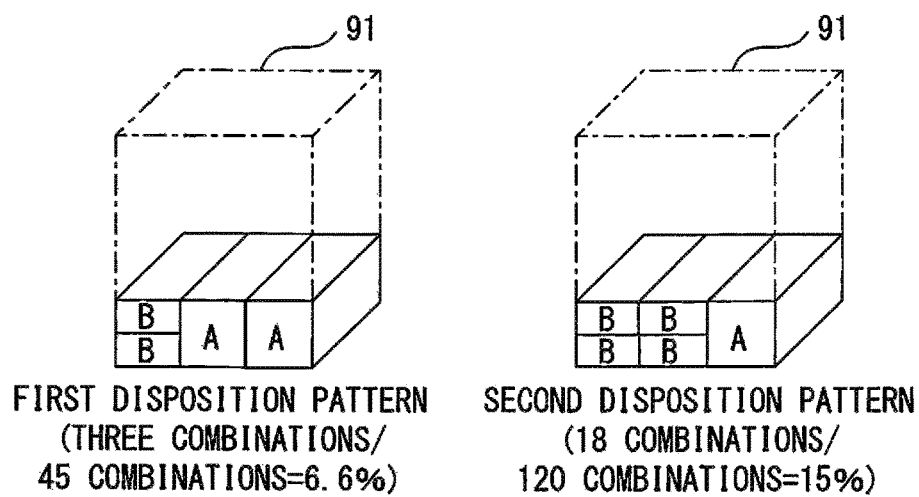
FIG. 20 is a perspective view of disposition patterns when the box is disposed at a first candidate.

FIG. 20 is a schematic diagram illustrating a probability of completion of a layer when the box is disposed at the first candidate. A layer generated when the box is disposed at the first candidate corresponds to a first disposition pattern and a second disposition pattern among the disposition patterns as illustrated in FIG. 18.

In calculation of the first probability, similarly to calculation of the second probability as described above, a probability in which the boxes required to complete a layer are successively conveyed is calculated with respect to each disposition pattern. For example, in the first disposition pattern, the position calculation part 43 calculates a probability in which two of the box A are successively conveyed among ten of the remaining boxes. The probability can be calculated by $(_3C_2)/(_{10}C_2)$ and is 6.6%. In the second disposition pattern, the probability is 15%. Consequently, when the box B is disposed at a position of the first candidate, the first probability of completion of a layer is 6.6%+15%=21.6%.

Figure 21:
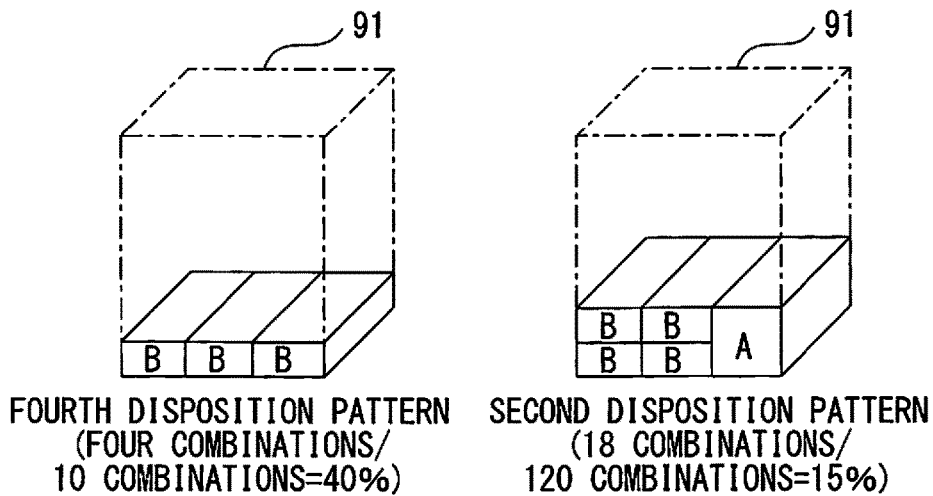
FIG. 21 is a perspective view of disposition patterns when the box is disposed at a second candidate.

FIG. 21 is a schematic diagram illustrating a probability of completion of a layer when the box is disposed at the second candidate. A layer which can be generated at a position of the box of the second candidate corresponds to a fourth disposition pattern and the second disposition pattern among the disposition patterns as illustrated in FIG. 18. Then, a probability of completion of a layer of the fourth disposition pattern is 40%. A probability of completion of the second disposition pattern is 15%. Consequently, when the box B is disposed at the position of the second candidate, the first probability of completion of a layer is 40%+15%=55%. Thus, the position determination part 43 can calculate the second probability of completion of a layer based on types and the number of the remaining boxes when the box to be disposed in the ongoing operation is disposed at a predetermined position.

With reference to FIG. 16, next, in step 159, the position determination part 43 judges whether or not all the position candidates at which the box is disposed are selected. When a box position candidate remains, the control returns to step 155 and a position candidate at which the box is disposed is selected. Then, the similar control is performed. In step 159, when all the position candidates have been selected, the control proceeds to step 160.

Next, in step 160, the position determination part 43 judges whether or not a box position candidate remains. In step 160, when a box position candidate remains, the control proceeds to step 161. In step 161, the position determination part 43 selects a position of the box at which the first probability of completion of a layer is the highest. On the other hand, in step 160, there is a case in which no position candidate of the box remains. For example, in determination in step 158, when all the position candidates of the box are excluded, no position candidate of the box remains. In this case, the control proceeds to step 162.

In step 162, the first probability of completion of a layer is calculated with respect to each position candidate of the box which is temporarily stored in step 158. The first probability is calculated by the process similar to step 157. Thereafter, the control proceeds to step 161. In step 161, the position determination part 43 selects a position of the box at which the first probability of completion of a layer is the highest.

In step 161, the control for selecting a position of the box at which the first probability of completion of a layer is the highest is performed, whereby the box can be disposed at a position at which the probability of completion of a layer is high. As a result, a large number of boxes can be disposed in a storage area and an impossibility of disposing all the boxes in the storage area can be suppressed. Thus, the position determination part 43 can select a position at which the box is disposed. Then, the robot 1 can convey the box to the selected position.

With reference to FIG. 5, the first control according to the present embodiment may be performed once at the beginning. Then, every time the box is conveyed by the conveyor, the second control to the fifth control can be performed. The second control to the fifth control are repeated, whereby positions of all the boxes can be separately determined.

The stowage pattern calculation device according to the present embodiment creates a layer in which boxes are horizontally disposed and calculates a stowage pattern by stacking the created layer in a height direction of a storage area. The stowage pattern calculation device according to the present embodiment calculates the layer extending in the horizontal direction at the beginning so that a large number of boxes can be disposed in a horizontal direction of the storage area. Accordingly, a bottom area of each layer becomes large and the stability becomes high when the boxes are disposed in the storage area.

Note that with reference to FIG. 15, in step 148, there is a case in which it is determined that the conveyed box is disposed on the temporary placement table 33. However, there is a case in which the box cannot be disposed on the temporary placement table 33 since a large number of boxes are disposed on the temporary placement table 33. Alternatively, there is a case in which the stowage system does not comprise the temporary placement table 33. In this case, a sixth control for dividing the storage area 91 is performed.

Figure 22:
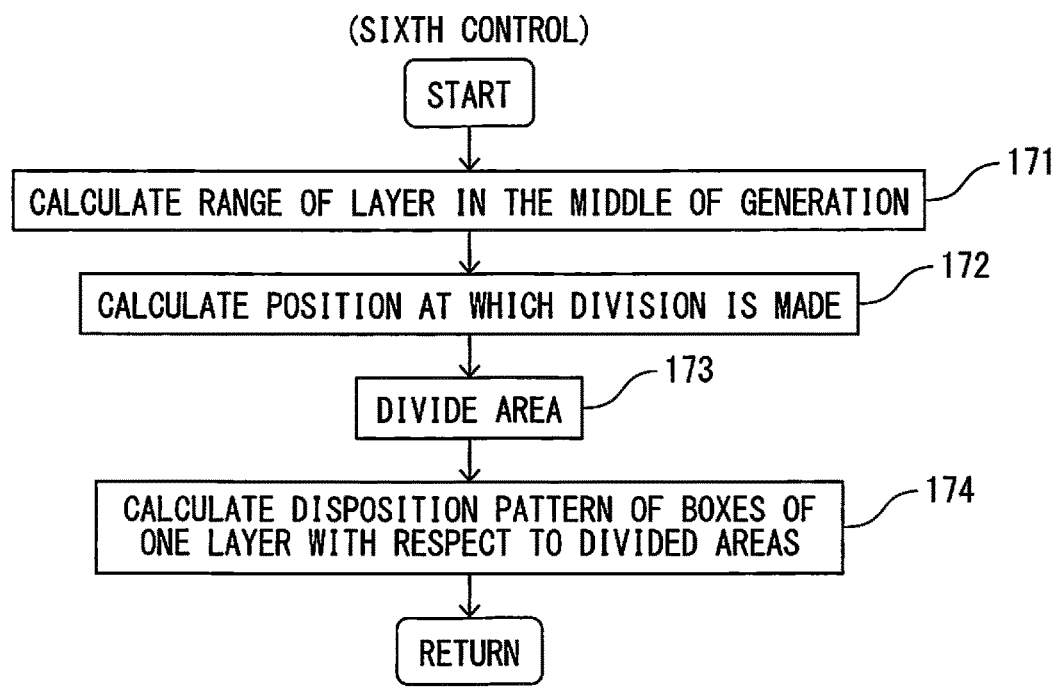
FIG. 22 is a flowchart of a sixth control according to the embodiment.

FIG. 22 shows a flowchart of the sixth control according to the present embodiment. In the present embodiment, the division area setting part 54 of the combination calculation part 42 performs the sixth control.

In step 171, the division area setting part 54 calculates a range of a layer in the middle of generation. In step 172, the division area setting part 54 calculates a position at which division is made. Then, in step 173, the division area setting part 54 divides an area at the calculated position.

Figure 23:
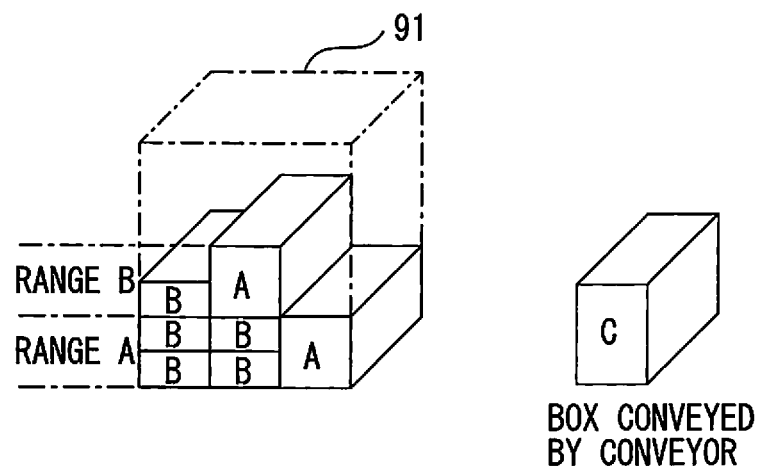
FIG. 23 is a diagram of a current state of the system for illustration of the sixth control according to the embodiment.

FIG. 23 is a schematic diagram of a current state for illustration of the sixth control. In the storage area 91, the plurality of boxes B and the plurality of boxes A are stacked. The description will be made by illustrating a state in which the box C is conveyed herein by the conveyor 31. The division area setting part 54 detects that one layer is completed in a range A partitioned at a predetermined position in the height direction. The division area setting part 54 detects that a range B is a layer in the middle of generation. Then, the division area setting part 54 sets a position at which division is made based on the disposition pattern of the boxes stacked in the range B.

Figure 24:
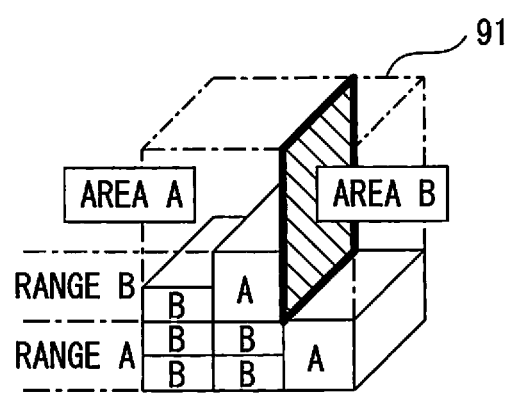
FIG. 24 is a perspective view illustrating areas divided by a division area setting part.

FIG. 24 is a schematic diagram of the storage area for illustration of an area division position. The division area setting part 54 selects such a position at which the layer in the middle of generation can be completed as much as possible. For example, a part at which a height of a top surface is different corresponds to the layer in the middle of generation. In an example as illustrated in FIG. 24, a column on the extreme left and a column at the middle in the range B corresponds to the layer in the middle of generation. The division area setting part 54 does not partition an area at the interior of the layer in the middle of generation but divides the area outside the layer in the middle of generation. In addition, the division area setting part 54 performs division so that a bottom area required for the layer in the middle of generation to be completed after division becomes the smallest. In the example as illustrated in FIG. 24, the division area setting part 54 divides the storage area 91 to generate an area A and an area B.

Note that when there is no layer in the middle of generation, the layers calculated by the first control can be divided into an area containing the box conveyed by the conveyor and further generating a layer having the smallest bottom area and the other area. In addition, the division area setting part 54 may further divide an area which has been divided before. Thus, the division area setting part 54 can set division areas by dividing the storage area.

With reference to FIG. 22, in step 174, the division area setting part 54 calculates a disposition pattern of the boxes constituting a layer with respect to each divided area. In other words, the position calculation part 41 determines a position of the box to be disposed by repeating the second control to the fifth control with respect to each division area. When an area is divided, a final height of the boxes with respect to each divided area may be different from each other.

In the plurality of types of articles according to the present embodiment, the lateral widths and the longitudinal lengths are identical to each other, but this configuration is not limitative, and the present invention can be applied also to a case in which a plurality of articles having lateral widths and longitudinal lengths different from each other are included.

In each control as described above, the order of the steps can be changed as long as the functions and effects are not changed.

In the stowage pattern calculation device of the present invention, when a plurality of types of articles are stowed, in a case of irregular order of the types of the articles to be stowed, suitable positions at which the articles are stowed can be calculated.

Further, the embodiments as described above can be suitably combined. In each figure as described above, the same or similar components are assigned the same reference signs. Note that the embodiments as described above are illustrative and are not to limit the invention. Moreover, the embodiments include modifications of the embodiments recited in the claims.

The invention claimed is:

1. A stowage pattern calculation device in which positions of articles irregularly conveyed are calculated when a plurality of articles are disposed by a robot in a storage area determined in advance, wherein the plurality of articles have a box shape and include articles having dimensions different from each other, the device comprising:
    a storage part which stores number and dimensions with respect to each of types of the articles stacked in the storage area;
    a combination calculation part which calculates a combination of the articles constituting a layer formed in the storage area and selects the layer of the articles which can be formed in the storage area based on the types of a conveyed article, a height of the layer, and an area of the layer; and
    a position determination part which calculates a first probability of completion of the layer with respect to the layer selected by the combination calculation part and determines positions at which the article is stacked based on a positional relationship between the robot and the storage area and the first probability,
    wherein the device is configured to control the robot to dispose the article at the determined positions.

2. The stowage pattern calculation device according to claim 1, wherein the combination calculation part generates the combination of the articles which can be disposed in an interior of the storage area, has a constant height, and has a rectangular planar shape as the layer.

3. The stowage pattern calculation device according to claim 1, wherein when a new layer is generated, the combination calculation part selects the layer to be newly generated based on an area when a new layer is planarly viewed and center gravity positions of the articles constituting the new layer.

4. The stowage pattern calculation device according to claim 1, wherein the combination calculation part obtains number of remaining articles not disposed in the storage area with respect to each type, calculates a second probability based on the type of the conveyed article and the number of the remaining articles with respect to each type, and excludes a combination in which the second probability is no more than a predetermined judgement value.

5. The stowage pattern calculation device according to claim 1, wherein the combination calculation part obtains number of remaining articles not disposed in the storage area with respect to each type, and selects a control for stacking the conveyed article on the layer in the middle of generation, a control for creating a new layer on the layer in the middle of generation, or a control for disposition on a temporary placement place based on the type of the conveyed article and the number of the remaining articles with respect to each type.

6. The stowage pattern calculation device according to claim 1, wherein when judging that there is no place at which the conveyed article is placed, the combination calculation part divides the layer serving as a base for the layer in the middle of generation so as to generate division areas and calculates the combination of the articles constituting the layer with respect to each division area.

7. The stowage pattern calculation device according to claim 1, wherein the position determination part selects positions at which the ongoing article is stacked so that a height of the articles stacked in the storage area is smaller at a position close to the robot than at a position distant from the robot, and selects a position at which the first probability is the highest among the selected positions as a position at which the article is stacked.

* * * * *